United States Patent
Izumida et al.

(10) Patent No.: US 6,336,153 B1
(45) Date of Patent: Jan. 1, 2002

(54) HIGH-SPEED HYBERNATION

(75) Inventors: Takayuki Izumida, Tokyo; Naonobu Fujiwara, Tokorozawa, both of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/257,042

(22) Filed: Feb. 25, 1999

(30) Foreign Application Priority Data

Feb. 26, 1998 (JP) ................................................. 10-045289

(51) Int. Cl.[7] ........................................................ G06F 13/00
(52) U.S. Cl. ............................. 710/20; 710/46; 711/168; 713/320
(58) Field of Search ........................... 710/20–28, 33–35, 710/46–48, 260 T; 711/167–173; 713/300–360

(56) References Cited

U.S. PATENT DOCUMENTS

| 5,512,921 A | * | 4/1996 | Mital et al. | 345/202 |
| 5,586,285 A | * | 12/1996 | Hasbun et al. | 711/103 |
| 5,590,340 A | | 12/1996 | Morita et al. | 713/323 |
| 5,696,897 A | | 12/1997 | Dong | 378/109 |
| 5,805,910 A | * | 9/1998 | Lee et al. | 713/323 |
| 5,928,365 A | * | 7/1999 | Yoshida | 713/324 |
| 6,035,068 A | * | 3/2000 | Imai | 382/232 |
| 6,145,068 A | * | 11/2000 | Lewis | 711/170 |

FOREIGN PATENT DOCUMENTS

| JP | 5-73476 | 3/1993 |
| JP | 7-160598 | 6/1995 |
| JP | 9-319667 | 12/1997 |

* cited by examiner

*Primary Examiner*—Christopher B. Shin
(74) *Attorney, Agent, or Firm*—Finnegan, Henderson, Farabow, Garrett & Dunner, L.L.P.

(57) ABSTRACT

In a write process of compressed data #1, data transfer for one sector from a CPU to an HDD, and a local write for one sector by the HDD repeat themselves for 256 sectors. During the write process period, the system BIOS compresses data of the next data block by utilizing the period in which a local write is made by the HDD. That is, upon completion of data transfer for one sector, the system BIOS waits for completion of the local write for one sector by the HDD, and then transfers the next data for one sector. During that local write completion wait period, the system BIOS compresses the next data.

14 Claims, 11 Drawing Sheets

HYBERNATION PROCESS (A)

RESUME PROCESS (B)

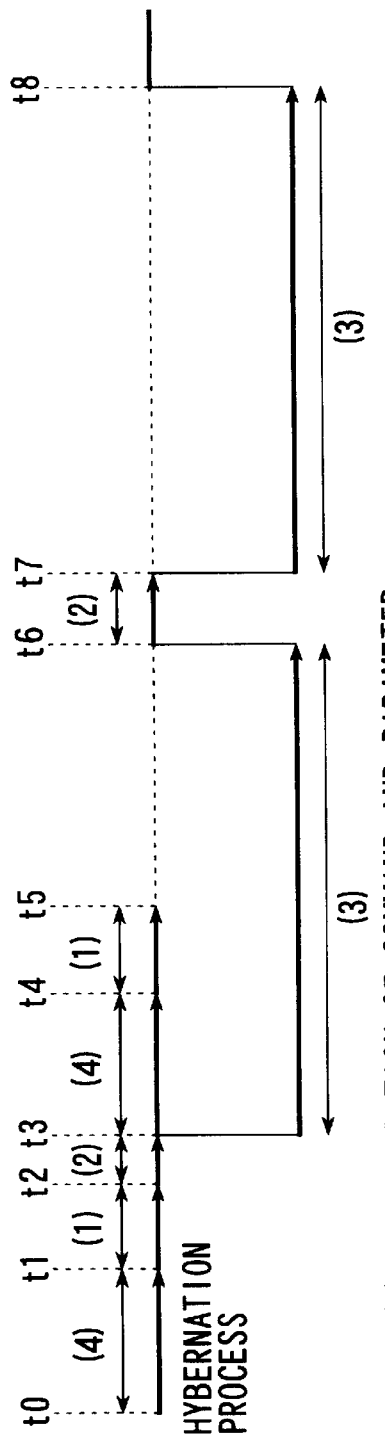
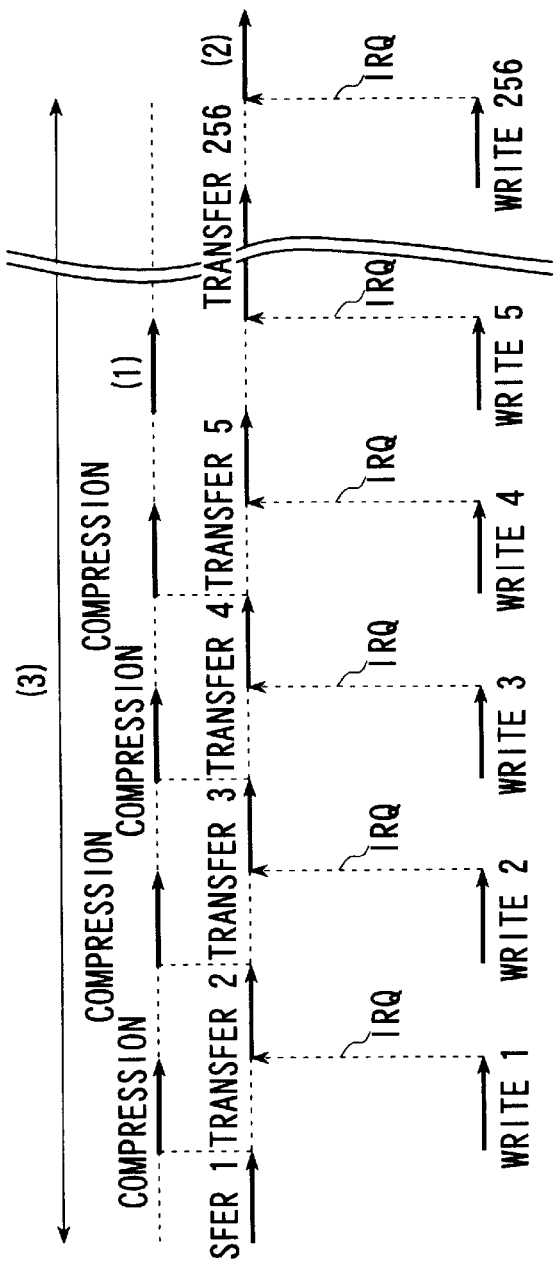
(1) : PREPARATION OF COMMAND AND PARAMETER
(2) : COMMAND TRANSMISSION
(3) : WRITE PROCESS (DATA TRANSMISSION TO HDD + WRITE OPERATION OF HDD)
(4) : DATA COMPRESSION PROCESS
FIG. 3
FIG. 4A
FIG. 4B
FIG. 4C

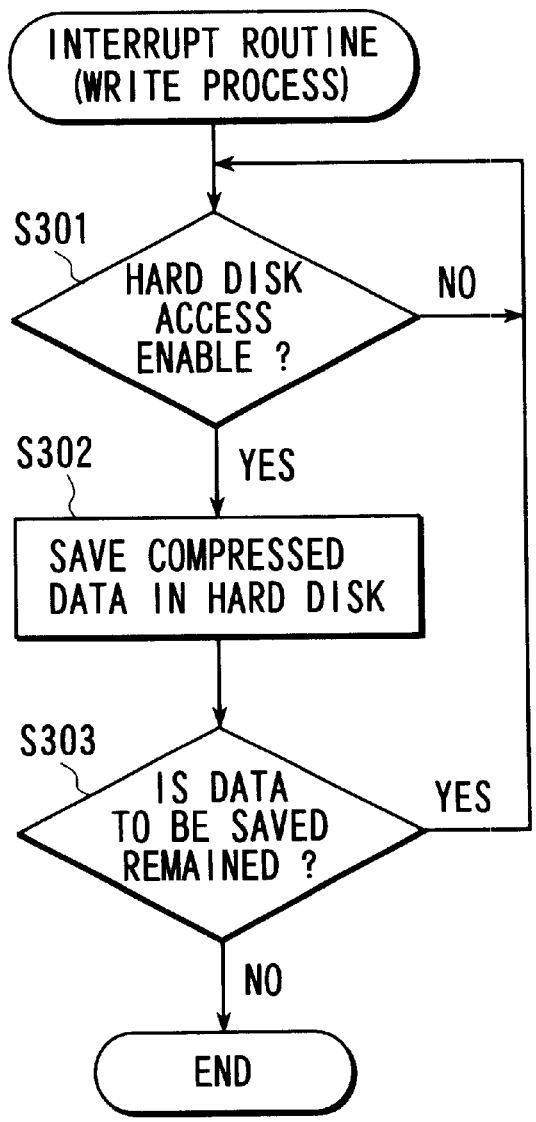
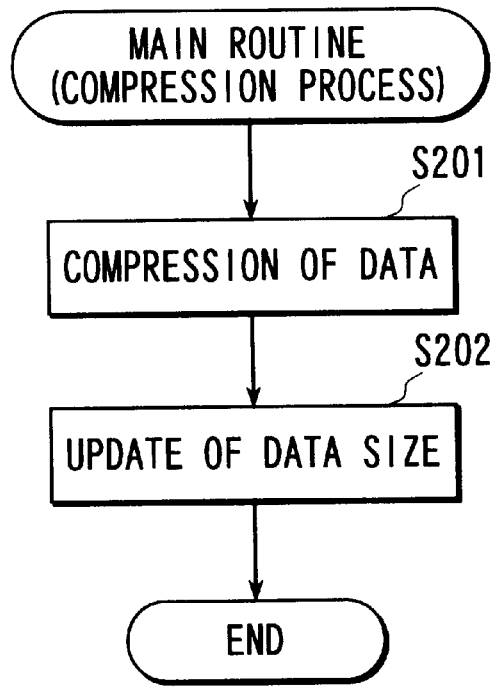
FIG. 6A
FIG. 6B

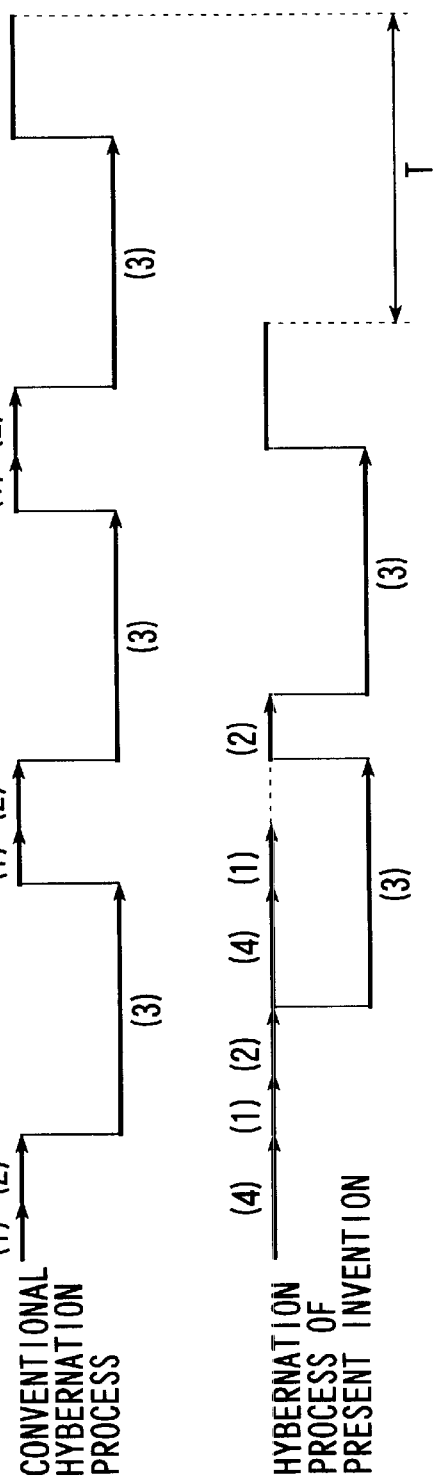

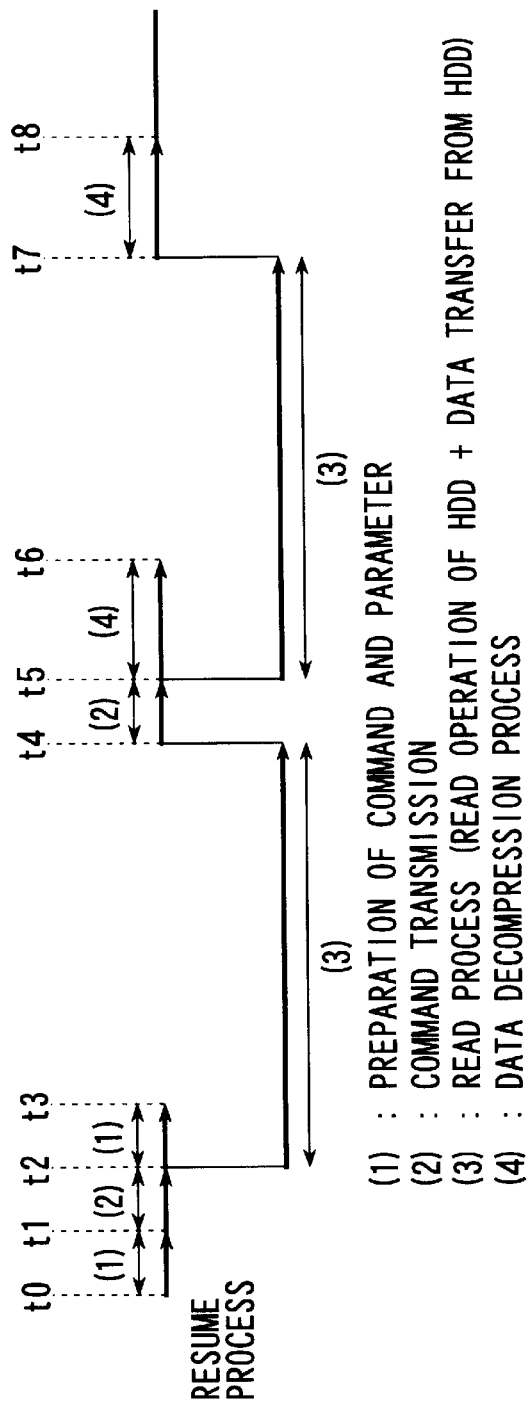
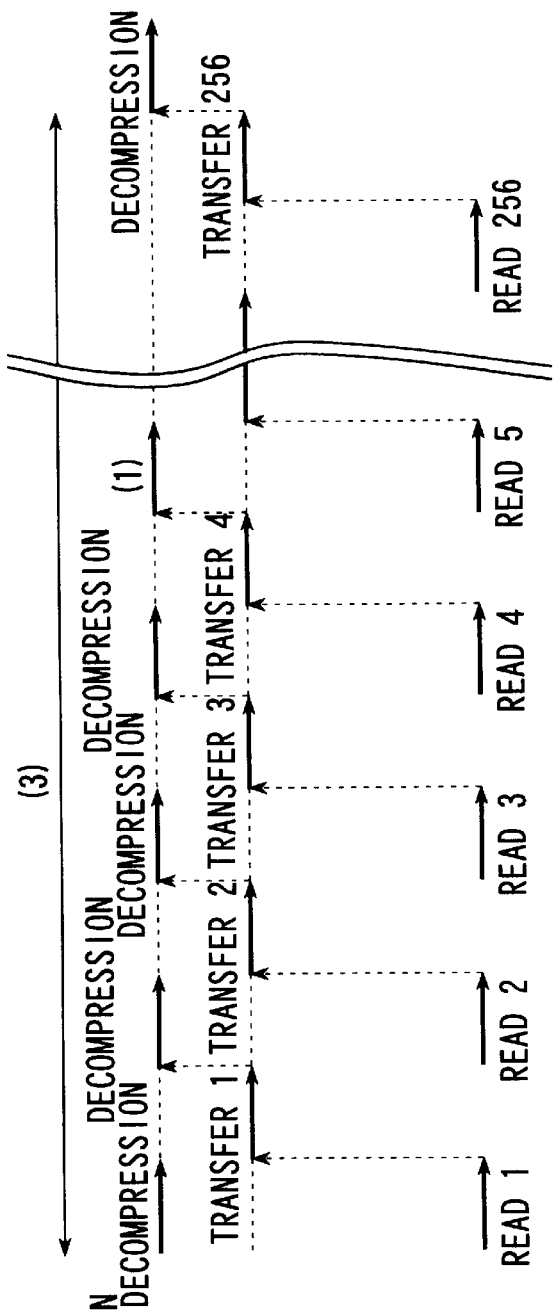
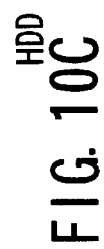

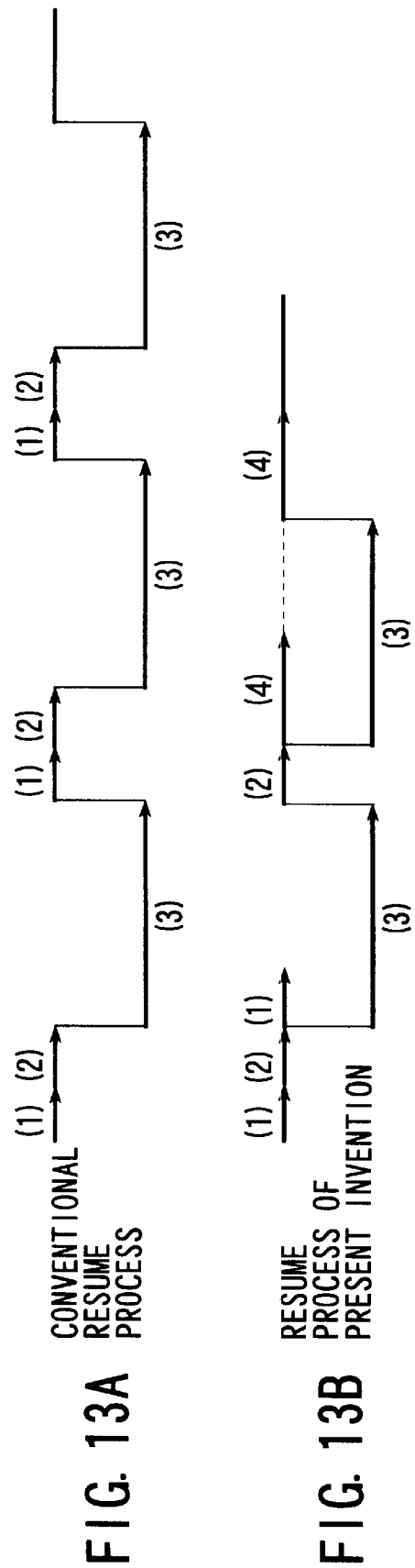

HIGH-SPEED HYBERNATION

BACKGROUND OF THE INVENTION

This application is based on Japanese Patent Application No. 10-45289, filed Feb. 26, 1998, the contents of which is incorporated herein by reference.

The present invention relates to a computer system and a data saving/resuming method for the system and, more particularly, to a computer system having a hybernation function of saving the contents of a memory of the computer system in an I/O device such as a hard disk or the like, and a data saving/resuming method used for executing that hybernation, and resuming from the hybernation.

In recent years, hybernation is beginning to be used as a new power save mode in place of the suspend mode. In the hybernation mode, the contents of the main memory upon system power OFF are saved in a hard disk, and all the devices in the system go power-down. In this mode, consumption power can be lower than that in the suspend mode.

Along with recent improvements in the functions of the operating system and application programs, the memory capacity mounted as a main memory in the computer system is increasing. As the storage capacity of the main memory increases, the time required for saving the contents of the main memory in the hard disk becomes longer.

For this reason, in the system with the hybernation function, the time required for hybernation, i.e., the time from when the user or operating system issues a hybernation request until the system actually goes power OFF tends to increase.

In general, in the hybernation mode, the hard disk must be accessed a plurality of number of times so as to save all the memory data. Since the conventional system has a mechanism of detecting the end of a write to the hard disk using polling, a polling process must be periodically made while a local write is made in the hard disk, after command transmission.

For this reason, a process required for the next hard disk access such as command preparation or the like cannot be made during the write to the hard disk, and a process delay is produced due to so-called I/O wait.

BRIEF SUMMARY OF THE INVENTION

It is an object of the present invention to provide a computer system which can save/resume memory data at high speed by reducing the memory data volume to be saved in an I/O device without increasing the time required for the overall saving process by a compression process, by compressing the next data to be written while a write access is locally made by the I/O device, and a data saving/resuming method for the system.

In order to achieve the above object, according to the present invention, a computer system having a memory and I/O device, comprises data compression means for compressing data on the memory, and write access means for repetitively write-accessing the I/O device to save the memory data compressed by the data compression means in the I/O device, and is characterized in that memory data to be written in the I/O device by the next write access is compressed during a write period of the I/O device, which starts in response to the write access.

According to this computer system, since the next write data is compressed during the period in which a local write is made by the I/O device, the compression process can reduce the memory data volume to be saved in the I/O device without increasing the time required for the overall saving process. Hence, since memory data can be saved at high speed, high-speed hybernation can be assured by applying the saving method of the present invention to the hybernation.

Also, the present invention is characterized in that a write command required for executing the next write access is prepared during the period in which a local write is made by the I/O device. In this way, the command for the next write access can be immediately transmitted upon completion of a write in response to the first write access, thus further shortening the saving process time.

Furthermore, the present invention is characterized in that the write access means is implemented using interrupt means, and the control is passed from the write access means to the data compression means upon completion of the write access by the write access means, and the control is passed from the data compression means to the write access means again in response to an interrupt signal generated by the I/O device, which indicates completion of the write. By task switching using an interrupt process, parallel processes of write access and data compression can be efficiently done.

Moreover, the present invention is characterized by further comprising read access means for repetitively read-accessing the I/O device to read out the compressed memory data from the I/O device, and data decompression means for decompressing the compressed data read out from the I/O device and mapping the decompressed data on the memory, and in that the compressed data that has already been read out from the I/O device in response to the previous read access is decompressed by the data decompression means during a read period of the I/O period, which starts in response to the read access. In this fashion, since the previously readout data is decompressed during the period in which a local read is made by the I/O device, thus resuming the saved data at high speed.

As described above, according to the present invention, since the next write data is compressed during the period in which a local write is made by the I/O device, the memory data volume to be saved in the I/O device can be reduced without increasing the time required for the overall saving process by the compression process, and the memory data can be saved/resumed at high speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a timing chart showing the operation of the hibernation process of the embodiment shown in FIG. 1;

FIGS. 4A through 4C are views for explaining parallel operations of data compression and data transfer in the hybernation process of the embodiment shown in FIG. 1;

FIGS. 6A and 6B are flow charts showing the relationship between the main routine and interrupt routine used in the hybernation process of the embodiment shown in FIG. 1;

FIGS. 8A and 8B are charts comparing the hybernation process of the embodiment shown in FIG. 1, and a conventional hybernation process;

FIG. 9 is a timing chart showing the operation of a resume process of the embodiment shown in FIG. 1;

FIGS. 10A through 10C are charts for explaining parallel operations of data decompression and data transfer in the resume process of the embodiment shown in FIG. 1;

FIG 12A and 12B are flow charts showing the relationship between the main routine and interrupt routine used in the resume process of the embodiment shown in FIG. 1; and.

FIGS. 13A and 13B are charts comparing the resume process of the embodiment shown in FIG. 1, and a conventional resume process.

DETAILED DESCRIPTION OF THE INVENTION

The preferred embodiment of the present invention will now be described with reference to the accompanying drawings.

Figure 1:
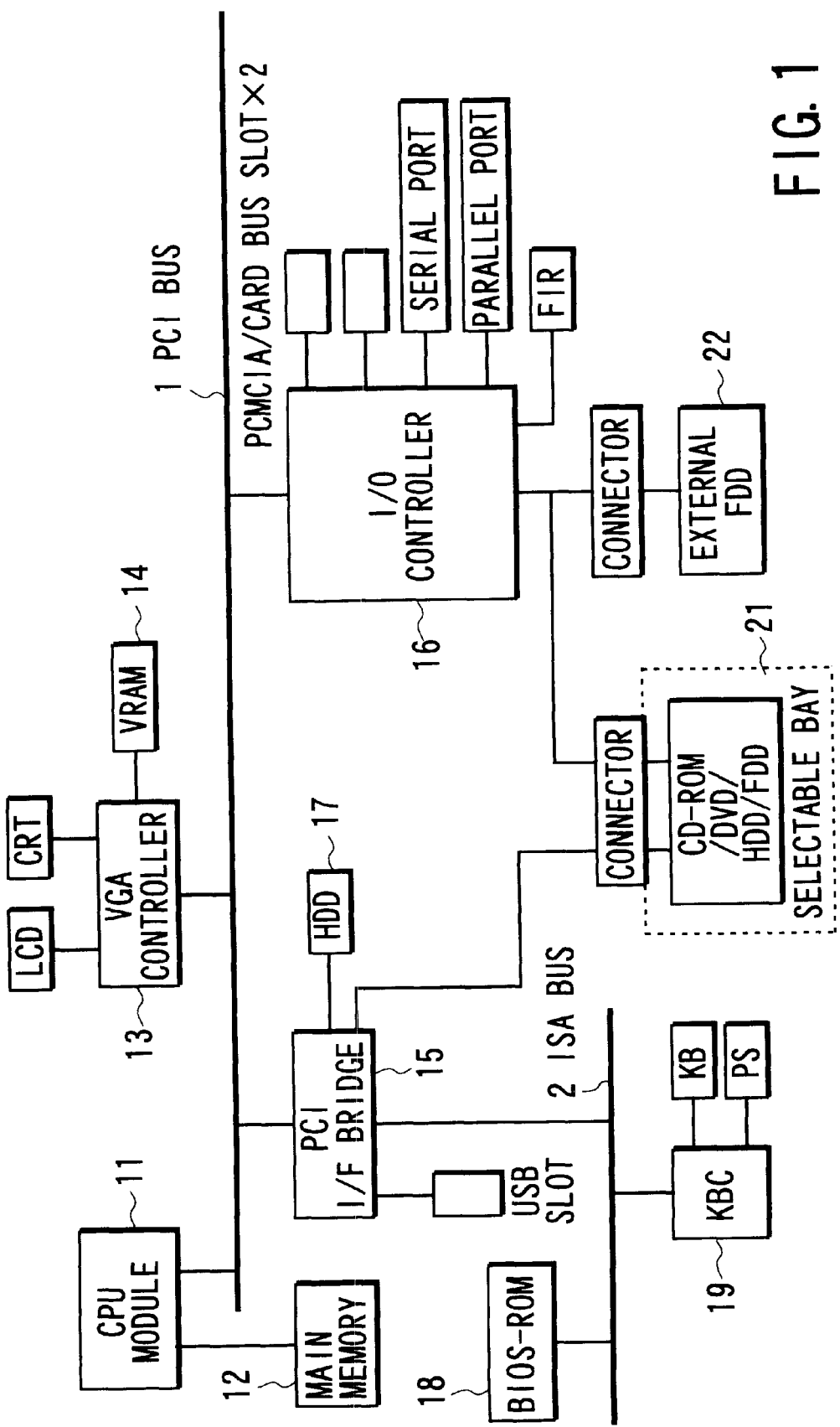
FIG. 1 is a block diagram showing the system arrangement of a computer system according to an embodiment of the present invention.

FIG. 1 shows the arrangement of a computer system according to an embodiment of the present invention. This computer system is a notebook or sub-notebook type portable personal computer, which is constructed by a computer main body, and an LCD panel unit which is attached to the computer main body to be free to open/close.

A PCI bus 1, ISA bus 2, CPU module 11, main memory 12, VGA controller 13, video memory (VRAM) 14, PCI interface bridge PCI (I/F) 15, I/O controller 16, HDD 17, BIOS-ROM 18, keyboard controller (KBC) 19, and the like are mounted on the system board of the computer main body.

The CPU module 11 executes the operation control and data processes of the whole system, and includes a CPU, a cache, a memory controller for controlling the main memory 12, and the like.

The main memory 12 is used as a main storage of this system, and stores an operating system, an application program to be processed, user data created by the application program, and the like. The main memory 12 is implemented by a semiconductor memory such as a synchronous DRAM or the like.

The VGA controller 13 controls an LCD or external CRT used as a display monitor of this system, and displays screen data rendered on the VRAM 14 on such display monitor.

The PCI interface bridge (PCI I/F) 15 is a gate array implemented by a one-chip LSI, and incorporates a bridge function for connecting the PCI bus 1 and ISA bus 2 two-ways. Also, the PCI interface bridge 15 incorporates an IDE controller for controlling the HDD 17 and various IDE devices (second HDD, CD-ROM drive, DVD drive, and the like) that can be selectively housed in a selectable bay 21 provided in the computer main body, a USB controller for controlling a USB device connected to a USB slot, and the like.

The I/O controller 16 is a gate array for controlling various I/O devices other than the IDE devices and USB devices, and has a function of controlling PC card complying with the PCMCIA/CARD BUS standard, and controlling an external FDD connected via a serial port, parallel port, infrared ray communication port (FIR), or dedicated connector, an FDD housed in the selectable bay 21, and the like.

The HDD 17 is used as a secondary storage device of this system, and a hybernation area having a predetermined capacity required for saving the contents of the main memory 12 is secured on a portion of its storage area. The hybernation area is secured by a system BIOS upon initializing and testing the HDD 17, and the remaining storage area except for the hybernation area is open to the OS (operating system). On the other hand, a dedicated partition serving as a hybernation area may be created on the HDD 17, and memory data of the main memory 12 may be saved there.

The BIOS-ROM 18 stores the system BIOS (Basic I/O System), and comprises a flash memory to allow to rewrite a program. The system BIOS is obtained by systematically organizing function execution routines for accessing various hardware components in this system, and includes a function of performing a hybernation process, and a resume function of resuming from the hybernation state.

The system BIOS includes an IRT routine executed upon power ON of the system, and BIOS drivers for controlling various hardware components. The individual BIOS drivers contain a plurality of function execution routines corresponding to hardware control functions to provide these functions to the operation system and application program.

The keyboard controller (KBC) 19 controls a keyboard (KB), and pointing devices such as a pointing stick (PS), mouse, and the like.

The hybernation process and resume process for resuming from the hybernation state as the characteristics features of the present invention will be explained in detail below.

The principle of the hybernation and resume processes will be explained below with reference to FIGS. 2A and 2B.

The system BIOS executes the hybernation process when the OS has issued a request for passing control to the hybernation state, or when the user has turned off the power switch or has pressed a suspend button. After the contents of the main memory 12 are saved in the HDD 17, the power supply of the system is turned off. At this time, the entire memory space to be saved is segmented into a plurality of memory blocks, and data is written in the HDD 17 in units of such blocks. In this embodiment, each block data on the main memory 12 is written in the HDD 17 not directly but after it is compressed, as shown in FIG. 2A.

Figure 2A:
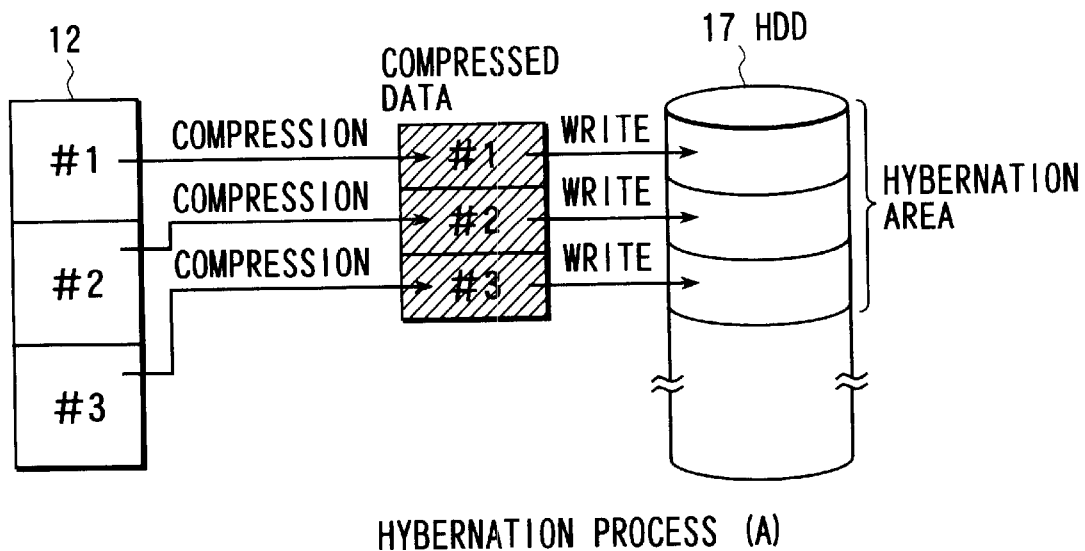
FIGS. 2A and 2B are views for explaining the principle of hybernation and resume processes of the embodiment shown in FIG. 1.
Figure 2B:
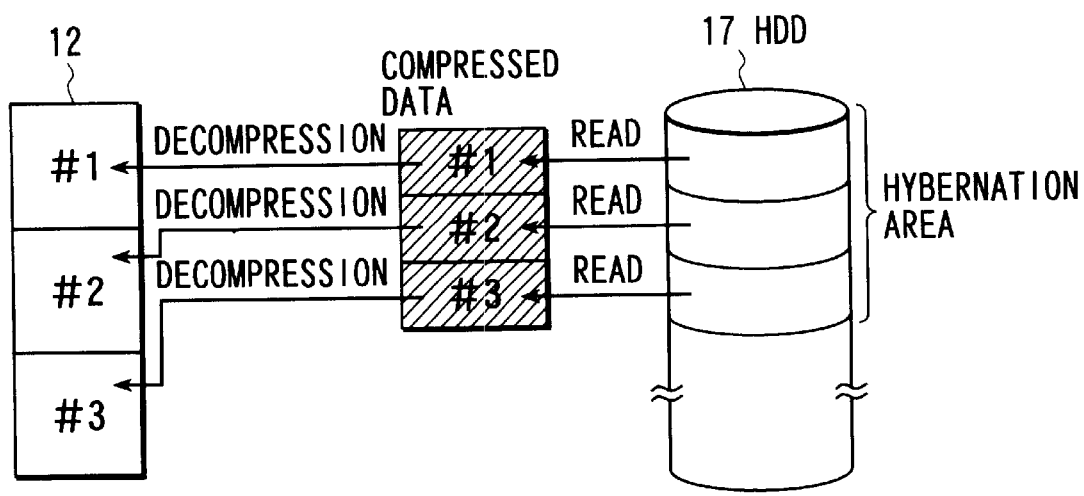

FIG. 2A shows a case wherein the entire memory space of the main memory 12 is segmented into three memory blocks, i.e., memory blocks #1 to #3, for the sake of simplicity. However, since an actual write access is made to the HDD 17 in a data size for 256 sectors that can be written by a single access in the HDD 17, the memory space is segmented into blocks having a compressed data size for 256 sectors. That is, the compression process entails such block segmentation.

Write accesses to the HDD 17 are executed in the order from compressed data #1 to compressed data #3. Upon reception of a write command from the system BIOS, the HDD 17 locally executes a write after that. In this embodiment, during the period in which compressed data #1 is locally written by the HDD 17, memory block #2 is compressed to prepare for the next compressed data #2. On the other hand, during the period in which compressed data #2 is locally written by the HDD 17, memory block #3 is compressed to prepare for the next compressed data #3.

In this fashion, since the next write data is compressed during the period in which a local write is made by the HDD 17, the memory data volume to be saved in the HDD 17 can be reduced without increasing the time required for the overall hybernation process by the compression process. Hence, high-speed hybernation process can be realized.

The system BIOS executes the resume process when the user has turned on the power switch in the hybernation state or when the OS has issued a resume request from the hybernation state. As shown in FIG. 2B, the compressed memory data saved in the HDD 17 are read out and written back to the main memory 12 after they are decompressed, thus resuming the contents of the memory 12 to a state before execution of hybernation.

Upon reception of a read command from the system BIOS, the HDD 17 locally executes a read after that. In this embodiment, during the period in which compressed data #2 is locally read out from the HDD 17, compressed data #1 that has already been read out from the HDD 17 is decompressed, and is mapped on memory block #1. Similarly, during the period in which compressed data #3 is locally read out by the HDD 17, compressed data #2 that has already been read out from the HDD 17 is decompressed and mapped on memory block #2.

FIG. 3 shows operations of the hybernation process by the system BIOS. For the sake of simplicity, FIG. 3 exemplifies a case wherein saving of all the memory data into the HDD 17 is completed by two write accesses of compressed data #1 and #2.

Upon reception of a hybernation request, the system BIOS starts a data compression process (4) of memory block #1 at time t0. This data compression process is done using, e.g., runlength coding, and runlength-coded data is written again on memory block #1. When compressed data for 256 sectors is obtained (t1), the system BIOS starts a command preparation process (1) including generation of a write command to be transmitted to the HDD 17 and its parameters, and the like.

Upon completion of the command preparation process (1), the system BIOS starts a command transmission process (2) at time t2 after it confirms that the HDD 17 is ready, and transmits a write command for instructing a data write for 256 sectors to the HDD 17. Upon transmission of the command, a write process (3) to the HDD 17 is started from time t3. In this write process (3), data transfer for one sector from the CPU 11 to the HDD 17 and a local write for one sector by the HDD 17 repeat themselves for 256 sectors.

During the period of the write process (3), the system BIOS executes a data compression process (4) of memory block #2 using the period in which a local write is made by the HDD 17. That is, upon completion of data transfer for one sector, the system BIOS waits for completion of the local write for one sector by the 17, and then transfers the next data for one sector. During this local write completion wait period, the system BIOS compresses data. With this process, the data compression process (4) of memory block #2 is made parallel to the write process of compressed data #1.

Upon completion of the data compression process (4) for the entire memory #2, i.e., when compressed data #2 for 256 sectors is prepared (time t4), the system BIOS performs the command preparation process (1) including generation of a write command and its parameters and the like as a preparation process of the next write access for writing compressed data #2 in the HDD 17, by using the period in which a local write is made by the HDD 17.

Upon completion of the write process (3) of the entire compressed data #1 (time t6), the system BIOS immediately transmits a write command for instructing a write of compressed data #2 for 256 sectors to the HDD 17 using the already prepared write command. Upon transmission of the command, the write process (3) to the HDD 17 is started from time t7. In this write process (3), data transfer for one sector from the CPU 11 to the HDD 17 and a local write for one sector by the HDD 17 repeat themselves for 256 sectors.

FIGS. 4A through 4C show the parallel processes during the period of the write process (3).

The hybernation process by the system BIOS is roughly classified into a main routine for compressing data, and a write process routine for writing data in the HDD. The write process routine is implemented using an interrupt process, and these compression and write processes are alternately switched and executed, as shown in FIGS. 4A through 4C in correspondence with changes in operation state of the HDD 17.

More specifically, in transfer process 1 by the write process routine (interrupt routine), data for the first sector in compressed data #1 is transferred from the CPU 11 to the HDD 17. Upon completion of the transfer process, write 1 for writing the transferred data for one sector is started by the HDD 17, and the control returns from the write process routine to the main routine, which executes a compression process of memory block #2. Upon completion of write 1 by the HDD 17, the HDD 17 informs the CPU 11 of this status using a hardware interrupt signal IRQ. With this interrupt, control is passed from the main routine to the write process routine, the compression process is temporarily interrupted, and transfer process 2 is executed by the write process routine. In transfer process 2, data for the second sector in compressed data #1 is transferred from the CPU 11 to the HDD 17. Upon completion of transfer process 2, the HDD 17 starts write 2, and the control returns from the write process routine to the main routine, which restarts the compression process of memory block #2.

In this way, during the periods in which data are locally written in the HDD 17 (writes 1, 2, 3, . . . ), memory block #2 is compressed. After compressed data for 256 sectors is obtained, the command preparation process (1) for the next write access is done during the local write of the HDD 17.

Figure 5:
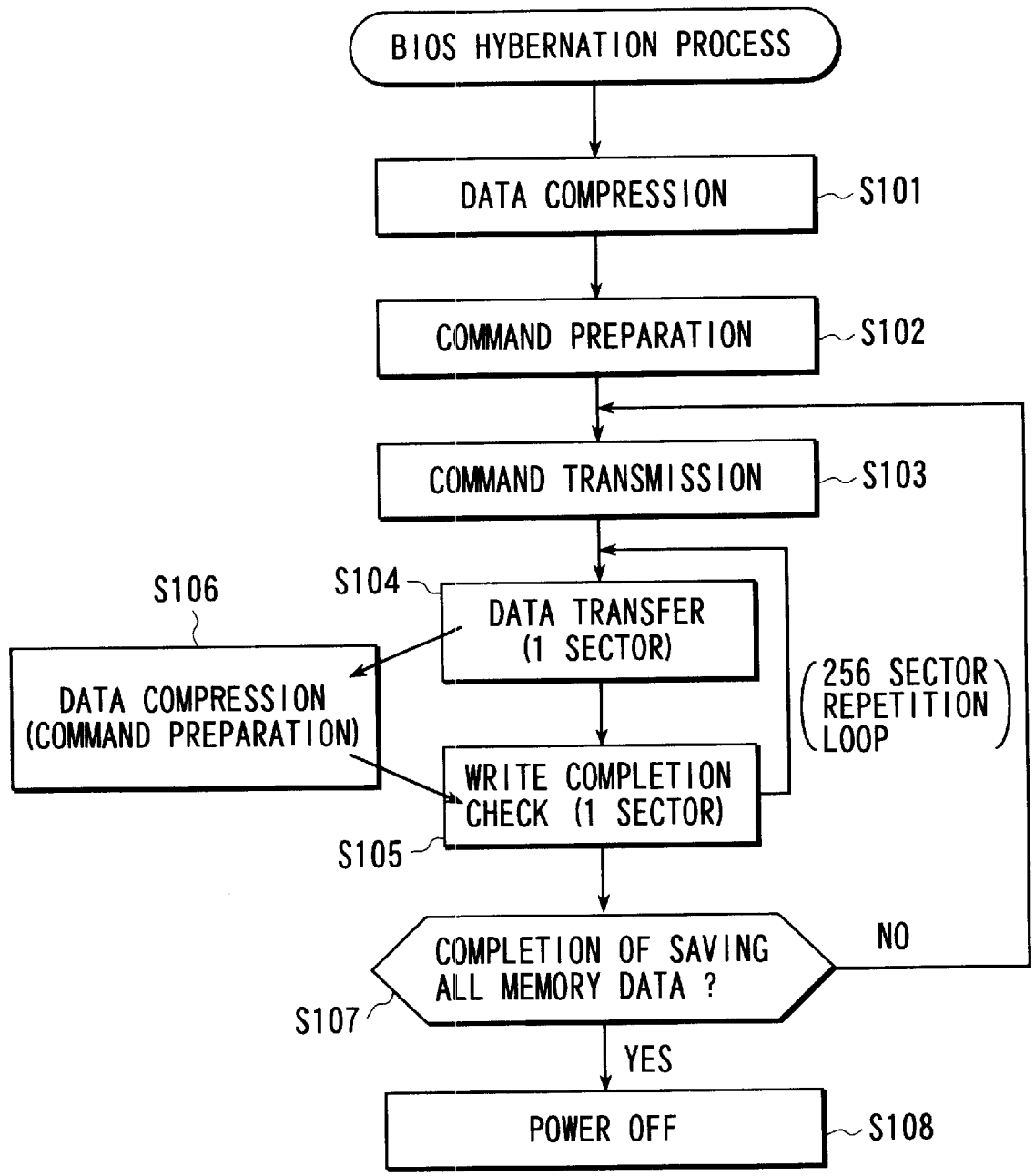
FIG. 5 is a flow chart showing the sequence of the overall hybernation process of the embodiment shown in FIG. 1.

The flow of the overall hybernation process executed by the system BIOS will be explained below with reference to the flow chart in FIG. 5.

Initially, memory block #1 is compressed to prepare for compressed data #1 for 256 sectors to be written in the HDD 17 by the first write access (step S101). After the aforementioned command preparation and transmission processes are made (steps S102 and S103), a data transfer process (step S104) for transferring data for one sector in compressed data #1 from the CPU 11 to the HDD 17 and a write completion check process (step S105) for confirming completion of a local write for one sector by the HDD 17 repeat themselves for 256 sectors. Note that the write completion check process (step S105) does not check status of the HDD 17 by polling but is implemented using an interrupt from the HDD 17. For this reason, after data for one sector is transferred to the HDD 17, the system BIOS is released from the write control of the HDD 17, and executes the data compression process of memory block #2 and the command preparation process for the next access during an I/O wait period from the time of completion of data transfer until the HDD 17 generates an interrupt signal that indicates completion of a write (step S106).

Upon completion of writes of all the sectors of compressed data #1, the flow returns to step S103 to start processes for writing compressed data #2.

Upon completion of saving of all the memory data (step S107), the system BIOS turns off the system power supply (step S108).

FIGS. 6A and 6B show the relationship between the aforementioned main routine and write process routine (interrupt routine) included in the hybernation process by the system BIOS.

That is, in the main routine, a data compression process (step S201) and a data size update process (step S202) for updating the data size of the prepared compressed data are executed. On the other hand, the write process routine (interrupt routine) controls actual write accesses to the HDD 17. In this routine, a process (step S301) for checking if the HDD 17 is accessible, and a write process (S303) for saving the compressed data obtained by the main routine in the HDD 17 are mainly executed, and steps S301 and S303 repeat themselves until all the data are saved.

Figure 7:
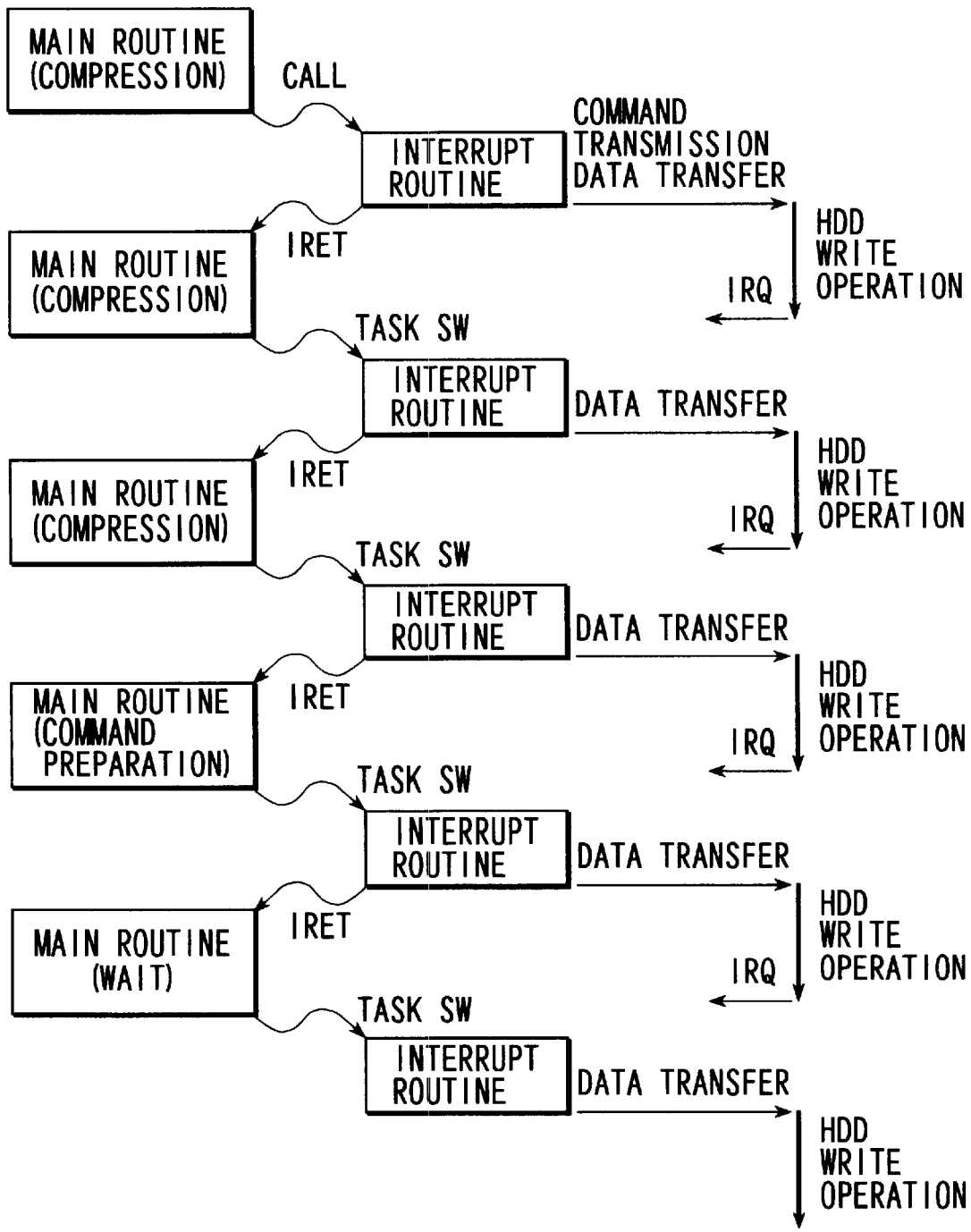
FIG. 7 is a chart showing task switching between the main routine and interrupt routine used in the hybernation process of the embodiment shown in FIG. 1.

FIG. 7 shows task switching between the main routine and write process routine (interrupt routine).

In the first write access, when compressed data #1 is ready to transfer, the main routine calls the write process routine (interrupt routine). The write process routine (interrupt routine) transmits a command and transfers data for the first sector. Upon completion of these processes, the control returns to the main routine. The main routine starts a compression process to prepare for the next compressed data #2. Upon generation of an interrupt signal from the HDD 17, the control is passed to the write process routine (interrupt routine) by task switching in response to the interrupt signal. Then, the write process routine (interrupt routine) transfers the next data for one sector. Upon completion of the data transfer, the control returns to the main routine again.

In this fashion, in the hybernation process of this embodiment, since the next write data is compressed during the period a local write is made by the HDD 17, the memory data volume to be saved in the HDD 17 can be reduced without increasing the time required for the overall saving process by the compression process. Hence, memory data can be saved at high speed, and high-speed hybernation process can be realized.

FIGS. 8A and 8B compare a conventional hybernation process and that of this embodiment.

FIG. 8A shows the conventional hybernation process, i.e., a case wherein saving of all the memory data is completed by three HDD accesses (256 sectors×3). In this conventional hybernation process, memory data are directly saved in the HDD without being compressed. Also, completion of a write by the HDD is detected by polling, and after completion of the first write process (3), a command preparation process (1) for the next HDD access is made.

FIG. 8B shows the hybernation process of this embodiment. Since data compression is used, saving of all the memory data is completed by a smaller number of HDD accesses (two in FIG. 8B) than the conventional process.

The data compression process (4) for the second HDD access and command preparation process (1) are made parallel to the first write process (3), as described above. Hence, as shown in FIG. 8B, the time required for the hybernation process can be shortened by time T as compared to the prior art.

FIG. 9 shows operation of the resume process by the system BIOS.

When the user has turned on the power switch in the hybernation state or when the OS has issued a resume request from the hybernation state, the system BIOS starts a command preparation process (1) including generation of a read command to be transmitted to the HDD 17 and its parameters and the like at time t0. Upon completion of the command preparation process (1), the system BIOS starts a command transmission process (2) at time t1 after it confirms that the HDD 17 is ready, and transmits a read command for instructing a data read for 256 sectors for compressed data #1 to the HDD 17. Upon transmission of the command, a read process (3) from the HDD 17 is started from time t2. In this read process (3), a local read for one sector by the HDD 17 and transfer of data for one sector from the HDD 17 to the memory 12 repeat themselves for 256 sectors.

During the period of the read process (3), the system BIOS performs the command preparation process (1) including generation of a read command and its parameters and the like as a preparation process for the next read access for reading out compressed data #2 from the HDD 2 by using the period in which a local read is made by the HDD 17.

Upon completion of the read process (3) for all the sectors of compressed data #1 (time t4), the system BIOS immediately transmits a read command for instructing a read of compressed data #2 for 256 sectors to the HDD 17 using the already prepared read command. Upon transmission of this command, the read process (3) from the HDD 17 is started from time t5. In this read process (3), a local read for one sector by the HDD 17 and transfer of data for one sector from the HDD 17 to the memory 12 repeat themselves for 256 sectors.

During the period of this read process (3), the system BIOS performs a decompression process (4) of compressed data #1 that has already been read out onto the memory 12 using the period in which a local read is made by the HDD 17. That is, upon completion of data transfer for the first sector, the system BIOS waits for completion of a local read for one sector by the HDD 17 and then transfers the next data for one sector. During the local read completion wait period, the system BIOS performs the decompression process. With this process, the decompression process (4) of compressed data #1 is made parallel to the read process of compressed data #2, and decompressed data is mapped on memory block #1.

When the data decompression process (4) for all the sectors of compressed data #1 is complete and the contents of memory block #1 is restored, the system BIOS waits during the period in which a local read is made by the HDD 17, and performs only data transfer.

Upon completion of the read process (3) of all the sectors of compressed data #2 (time t7), the system BIOS starts the decompression process of compressed data #2, and maps the decompressed result on memory block #2.

FIGS. 10A through 10C show the parallel processes during the period of the read process (3).

The resume process by the system BIOS is roughly classified into a main routine for decompressing data, and a read process routine for reading out data from the HDD. The read process routine is implemented using an interrupt process, and these decompression and read processes are alternately switched and executed, as shown in FIGS. 10A through 10C, in correspondence with changes in operation state of the HDD 17.

That is, when the read process routine transmits a read command, read 1 for reading out data for the first sector of compressed data #2 in a buffer in the HDD 17 is started by the HDD 17, and the control returns to the main routine to start a decompression process of compressed data #1. Upon completion of read 1 by the HDD 17, the HDD 17 informs the CPU 11 of that status using a hardware interrupt signal IRQ. With this interrupt, the control is passed from the main routine to the read process routine, the decompression process is temporarily interrupted, and the read process routine starts transfer process 1. In this transfer process 1, data for one sector is transferred from the buffer of the HDD 17 to the CPU 11, and is written in a work area on the memory 12. Upon completion of transfer process 1, read 2 for reading out the next data for one sector is started by the HDD 17, and the control returns from the read process routine to the main routine, which restarts the decompression process of compressed data #1.

In this way, during the periods in which local reads of the HDD 17 are made (reads 1, 2, 3, . . . , compressed data #1 that has already been read out onto the memory 12 by the previous read access is decompressed.

Figure 11:
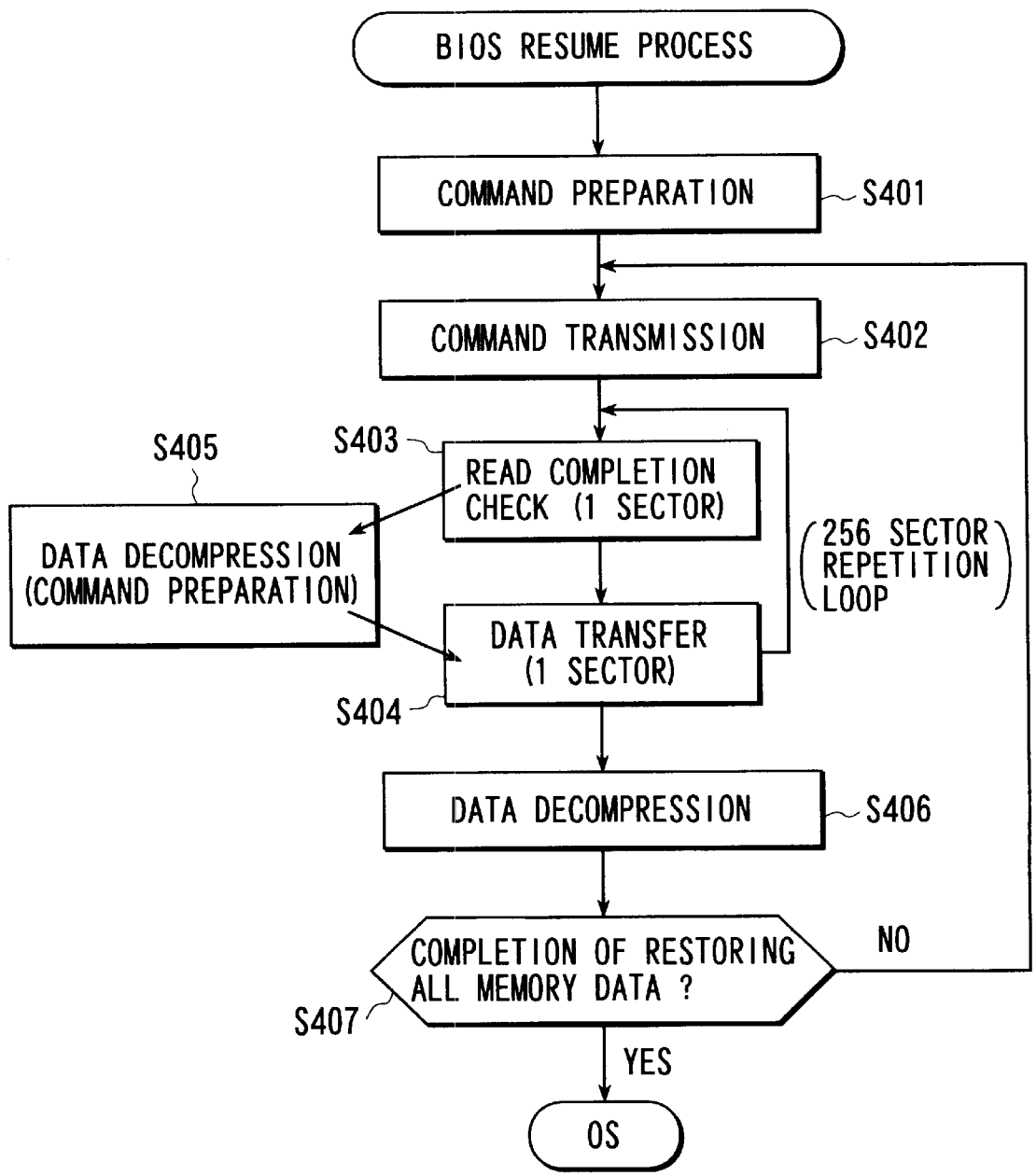
FIG. 11 is a flow chart showing the sequence of the overall resume process of the embodiment shown in FIG. 1.

The flow of the overall resume process executed by the system BIOS will be explained below with reference to the flow chart in FIG. 11.

After the aforementioned command preparation and transmission processes are done (steps S401 and S402), a read completion check process (step S403) for confirming completion of a local read for one sector by the HDD 17, and a data transfer process (step S404) for one sector from the HDD 17 to the CPU 11 repeat themselves for 256 sectors. Note that the read completion check process (step S403) does not check status of the HDD 17 by polling but is implemented using an interrupt from the HDD 17. For this reason, during the period in which a local read of compressed data is made by the HDD 17, the system BIOS is released from the read control of the HDD 17, and executes a decompression process of the already readout compressed data and a command preparation process for the next read access during an I/O wait period from the time of completion of data transfer until the HDD 17 generates an interrupt signal indicating completion of the next data read (step S405).

In this manner, upon completion of the read of compressed data #1, read of compressed data #2, and decompression of compressed data #1, compressed data #2 is decompressed in turn (step S406). Upon completion of saving of all the memory data (step S407), the control returns from the system BIOS to the OS, and a process restarts from the work state before the beginning of the hybernation state.

Figures 12A, 12B:
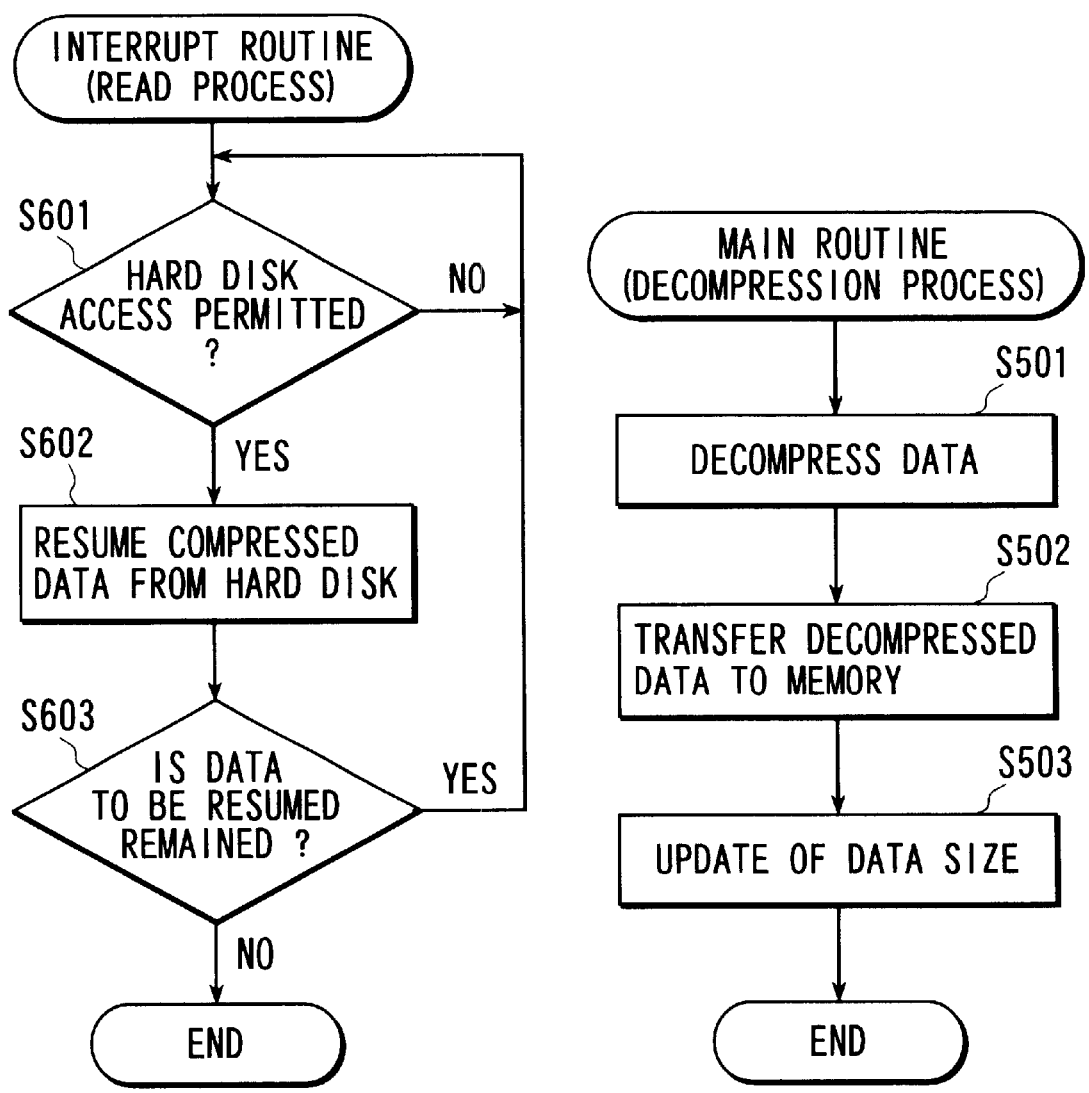

FIGS. 12A and 12B show the relationship between the aforementioned main routine and read process routine (interrupt routine) included in the resume process by the system BIOS.

More specifically, in the main routine, a data decompression process (step S501), a process (step S502) for writing the decompressed data back into an original position on the memory 12, and a data size update process (step S503) for updating the data size of the resumed data are executed. The read process routine (interrupt routine) controls actual read accesses to the HDD 17, and a process (step S601) for checking if the HDD 17 is accessible, and a process (step S602) for reading out compressed data from the HDD 17 are mainly executed. Steps S601 and S603 repeat themselves until all the data are read out from the hybernation area of the HDD 17.

Task switching between these main routine and read process routine (interrupt routine) is done in the same manner as in the hybernation process. That is, upon completion of data transfer by the read process routine (interrupt routine), the control returns from the read process routine to the main routine, and is passed again from the main routine to the read process routine (interrupt routine) in response to generation of an interrupt signal that indicates completion of a read.

As described above, in the resume process of this embodiment, since compressed data that has already read out onto the memory 12 is decompressed during the period in which a local read is made by the HDD 17, a high-speed resume process for resuming compressed memory data saved in the HDD 17 can be realized.

FIGS. 13A and 13B compare a conventional resume process and that of this embodiment.

FIG. 13A shows a conventional resume process, i.e., a case wherein all the memory data are resumed by three HDD accesses (256 sectors×3). In this conventional resume process, since completion of an HDD read is detected by polling, a command preparation process (1) for the next HDD access is started after completion of the read process (3).

FIG. 13B shows the resume process of this embodiment. Since data compression is used, all the memory data can be resumed by a smaller number of HDD accesses (two in FIG. 13B) than the conventional process. The decompression process (4) of compressed data #1 read out by the first HDD access, and the command preparation process (1) for the second HDD access are executed parallel to the read process (3). Hence, the time required for the resume process can be shortened as compared to the prior art, as shown in FIG. 13B.

In this embodiment, the decompression process of compressed data #1 and the read process of compressed data #2 are parallelly executed. Alternatively, compressed data #1 may be decompressed as they are read out.

Since this embodiment uses an arrangement that performs compression/decompression processes by utilizing the I/O wait time, the present invention may be applied not only to the hybernation/resume processes but also to normal data transfer with I/O devices which operate in response to a read/write command. In such case, the transfer time can be shortened when the transfer data size is large.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system, comprising:

a memory;

an input and output (I/O) unit;

means for performing a predetermined process on data stored in the memory;

I/O access means for I/O-accessing the I/O unit so as to save the data processed by the performing means into the I/O unit; and means for, in response to the I/O access, causing the performing means to perform predetermined process on the data stored in the memory to be written into the I/O unit by a next I/O access, during the I/O operation of the processed data into the I/O unit.

2. The computer system according to claim 1, wherein the I/O access means starts a write access by transmitting a write command to the I/O unit;

and further comprising means for preparing the write command necessary for the next write access, during the write operation of compressed data into the I/O unit.

3. The computer system according to claim 1, wherein the I/O access means starts next write access in response to an interrupt signal indicating a completion of the I/O operation from the I/O unit;

the performing means executes data compression operation during a period from a time at which the I/O access by the I/O access means is completed to a time at which the interrupt signal is generated.

4. The computer system according to claim 1, wherein the I/O access means transmits a write command to the I/O unit to thereby start a write access to the I/O unit, and thereafter repetitively executes data transfer to the I/O unit in units of a predetermined size, in response to an interrupt signal from the I/O unit indicating a completion of the write operation of the transferred data;

the performing means executes data processing operation during a period from a time at which the data transfer by the I/O access means is completed to a time at which the interrupt signal indicating the completion of the write operation of the transferred data, is generated from the I/O unit.

5. The computer system according to claim 1, further comprising:

read access means for repetitively executing a read access to the I/O unit so as to read out the compressed data from the I/O unit;

data compression means for decompressing the compressed data read out from the I/O unit and developing the decompressed data into the memory;

and wherein the compressed data which have been read out from the I/O unit by the preceding read accesses is decompressed by the data compression means, during a period of the read operation of the I/O unit triggered in response to the read access.

6. The system according to claim 5, further comprising:

means for preparing a read command instructing a read operation of first compressed data, to be transferred to the I/O unit;

means for transferring the read-access command to the I/O unit;

means for preparing next read-access command instructing read operation of second compressed data while reading operation of the first compressed data from the I/O unit is being executed in response to the read-access command;

means for transferring the next read command instructing read operation of the second compressed data to the I/O unit upon completion of the read operation of the first compressed data; and means for decompressing the first compressed data while the second compressed data is being read out from the I/O unit in response to the read command for the second compressed data.

7. The system according to claim 1, wherein the I/O unit has a function of turning off a power supply of the system after saving contents of a memory into a secondary storage unit.

8. A data saving method for saving data stored in a memory into an I/O unit by executing an I/O access to the I/O unit, comprising the steps of:

performing a predetermined process on data in the memory;

I/O-accessing the I/O unit in order to save the processed memory data into the I/O unit; and causing the performing step to process memory data to be written into the I/O unit by next I/O access while the I/O access step is I/O-accessing the I/O unit.

9. The method according to claim 8, wherein the I/O-accessing step starts an write access by transmitting a write command to the I/O unit;

and further comprising the step for preparing the write command necessary for a next write access, during the write operation of the processed data into the I/O unit.

10. The method according to claim 8, wherein next write-access to the I/O unit is executed in response to an interrupt signal from the I/O unit indicating completion of a write operation and compression of the memory data to be written by next write access is executed during a period from a time at which a first write access is completed to a time at which next write access is started by the generation of the interrupt signal from the I/O unit.

11. The method according to claim 8, wherein the I/O-accessing step transmits a write command to the I/O unit to thereby start a write access to the I/O unit, and thereafter repetitively executes data transfer to the I/O unit in units of a predetermined size, in response to an interrupt signal from the I/O unit indicating a completion of the write operation of the transferred data;

the performing step executes the data processing operation during a period from a time at which the data transfer by the I/O access means is completed to a time at which the interrupt signal indicating the completion of the write operation of the transferred data, is generated from the I/O unit.

12. The method according to claim 8, further comprising the steps of:

executing a read access to the I/O unit, the method comprising the steps of:

executing a read-access to the I/O unit in order to read the compressed memory data from the I/O unit; and decompressing compressed data which have been read out from the I/O unit by preceding read access and writing the decompressed data into the memory while the read-access to the I/O unit is executing.

13. The method according to claim 8, further comprising the steps of:

compressing data stored in the memory;

calling, by a main routine, an interrupt routine upon completion of compressing data;

transferring, by the interrupt routine, a predetermined size of the compressed data as well as a write command to the I/O unit, thereby starting a write operation of the transferred data into the I/O unit;

compressing, by the main routine, next data to be saved in the I/O unit;

task switching, by the main routine, a control from the main routine to the interrupt routine in response to an interrupt signal indicating completion of the write operation of the transferred data into the I/O unit, thereby the next predetermined size of compressed data being transferred to the I/O unit by the interrupt routine and thereafter returned to the main routine.

14. The method according to claim 8, further comprising the steps of:

transferring, by an interrupt routine, a read command to the I/O unit;

decompressing, by a main routine, first compressed data while read operation of second compressed data is being read out from the I/O unit;

informing, by an interrupt signal from the I/O unit, a CPU of the completion of the read operation of the second compressed data, thereby shifting a control from the main routine to the interrupt routine;

transferring, by the interrupt routine, the read out the second compressed data to the CPU, thereby shifting the control from the interrupt routine to the main routine;

decompressing, by the main routine, the first compressed data while the read operation of next data from the I/O unit is being executed.

* * * * *